United States Patent
Fender

[15] 3,683,263
[45] Aug. 8, 1972

[54] OSCILLATING CIRCUIT CONVERTER

[72] Inventor: Manfred Fender, Alte Harz-Strasse 17, Lerbach, Germany

[22] Filed: Feb. 2, 1971

[21] Appl. No.: 111,973

[30] Foreign Application Priority Data

Feb. 3, 1970 Germany..........P 20 04 627.9

[52] U.S. Cl. .............................321/45 R, 321/45 C
[51] Int. Cl. .............................................H02m 7/48
[58] Field of Search.........321/2, 45, 45 C; 331/113 S

[56] References Cited

UNITED STATES PATENTS

| | | | |
|---|---|---|---|
| 3,454,863 | 7/1969 | Hintz et al. | 321/44 |
| 3,278,827 | 10/1966 | Coney et al. | 321/45 C |
| 3,059,191 | 10/1962 | Hierholzer, Jr. et al. | 321/45 X |
| 3,348,124 | 10/1967 | Cielo | 321/45 |
| 3,406,327 | 10/1968 | Mapham et al. | 321/45 |
| 3,475,674 | 10/1969 | Porterfield et al. | 321/45 |

*Primary Examiner*—William M. Shoop, Jr.
*Attorney*—Craig, Antonelli & Hill

[57] ABSTRACT

This specification describes an oscillating circuit converter of the type including a bridge circuit with four control switches possessing valve characteristics, the first diagonal of the bridge containing a series circuit of a capacitor and a coil and the second diagonal of the bridge being connected to a DC voltage source and further including two switches mounted opposite from each other in the bridge and having the same pass direction and at least two switches each having a diode connected in parallel.

In the circuit converter of the type described the end points of the first diagonal of the bridge and containing the series circuit are individually connected with the first end point and/or the second end point of the second diagonal of the bridge using linear and/or nonlinear elements.

12 Claims, 14 Drawing Figures

PATENTED AUG 8 1972 3,683,263

Inventor:

MANFRED FENDER

BY Craig, Antonelli, Stewart + Hill
ATTORNEYS

Inventor:

MANFRED FENDER

BY Craig, Antonelli, Stewart & Hill
ATTORNEYS

OSCILLATING CIRCUIT CONVERTER

The invention relates to an oscillating circuit converter having a bridge circuit of at least four control switches with valve characteristics, the first diagonal of the bridge containing a series circuit of a capacitor and a coil, and the second diagonal thereof being connected to a DC voltage source, wherein always two switches mounted opposite each other in the bridge have the same pass direction and at least two switches have each a diode connected in antiparallel thereto.

According to the type of circuit and the switching state of the converter, the oscillating circuit oscillates freely, takes energy from the voltage source or transfers energy to the voltage source. The oscillating circuit converter is either used in devices for the inductive heating of materials, or as an inverter; when used as inverter, the lead connected to the oscillating circuit capacitor, dampens the oscillating circuit. The switches may be thyristors.

An oscillating circuit converter of this type is known which comprises two diodes and four thyristors in which each of the two diodes is connected in antiparallel to one of the two thyristors connected in series in the bridge.

Another oscillating circuit converter, with flour diodes and four thyristors is also available in which a diode is connected in antiparallel to each thyristor.

In both converters, the said diodes are dimensioned for the nominal current of the oscillating circuit.

A sine shaped alternating voltage with constant amplitude is produced with these converters by supplying energy during selectable sections of the duration of the half-period. After every zero passage of the oscillating circuit current one pair of thyristors with the same pass direction is blocked.

In consequence, in the first known converter, the oscillating circuit current stops at zero value. This leads, at the corresponding end point of the bridge, to a potential jump about the peak value of the voltage of the oscillating circuit capacitor. This may be used for producing a control signal for the thyristor of the other pair to be fired and initiating a free oscillation through this thyristor and the corresponding diode.

In the second known converter, the two additional diodes prevent these potential jumps in that they make possible an oscillation through the source immediately after the zero passage of the current. In consequence, the blocking voltage occurring at the thyristors becomes substantially smaller than in the first known converter. In addition, the free oscillation is replaced by an energy feedback.

If the converter has a load with reactive components, this causes a change in the frequency, but for many applications this must be constant.

The object of the invention is to avoid the disadvantages of known oscillating circuit converters; in particular, the potential jumps should be limited and are used to transform control pulses which should serve for controlling the two thyristors from the bridge.

Furthermore, with the use of thyristors the free growth times should be kept smaller.

The frequency of the converter should be held constant by simple means.

According to the invention, the end points of the first diagonal which contains the series circuit of the oscillating circuit, are connected individually with the first end point and/or with the second end point of the second diagonal by combinations of linear and non-linear elements.

The elements used may comprise resistors, capacitors, diodes, overvoltage shunts or the like.

Preferably, each of the two end points of the first diagonal is connected by a series circuit of a capacitor and a resistor with the first end point of the second diagonal. In a second preferred embodiment, the end points of the first diagonal are each connected by a series circuit of a resistor and a diode with the second end point of the second diagonal, in which arrangement the pass direction of the diode is directed from the second end point to the associated end point of the first diagonal.

In a third embodiment, each end point of the first diagonal is connected through a series circuit of a diode and a resistor with the second end point of the second diagonal, wherein a series circuit of a capacitor and a resistor is mounted between the junction of diode and resistor, and the first end point of the second diagonal, and the anode of the diode is connected to the junction.

In these various embodiments, the potential jumps are so limited and transformed that the course of the potential at the end points of the diagonals of the oscillating circuit always, and with reliability, produces a control signal for the valves on which the shifting current from the combination of elements should be switched over, i.e. for the valves which, after the quenching of one pair of valves during zero passage of the oscillating circuit current should be the first to be refired. Since this ignition takes place with small current values during the next half-period and the elements are therefore loaded at low current strength only for short periods, the elements of the additional circuit may be kept very small.

In view of the properties of the thyristors, the additional circuit may be so constructed that the negative blocking voltage at the instant of the potential jump is large enough to ensure a small free period of growth.

In the first embodiment, there occurs no energy feedback. In the second embodiment, there occurs a very small feedback compared with the second known converter, and this may be taken up, for example, by a capacitor connected in parallel to the source. The third preferred converter works perfectly if the voltage source does not permit an energy feedback.

In all converters according to the invention, after zero passage of the current there occurs no pause in which the current is of zero value.

In order to achieve frequency control of the device according to the invention, the inductance of the oscillating circuit and an additional inductance are connected in series, wherein the additional inductance can be short circuited only by two valves in antiparallel arrangement, so that the duration of a half-period of the oscillating circuit is variable. The converter may be synchronized to the control signals of a pulse generator. Also a parallel mounting of the coils may be convenient.

The invention also provides that, when a load is connected through a transformer into one supply lead of the transformer a capacitor is inserted in order not to saturate the transformer by a DC component in the primary current. Such a component may arise in consequence of asymmetry of the construction, or by an unbalanced control of the electronic switches.

The invention will be hereinafter described with reference to the accompanying drawings showing different embodiments, and in which.

Figure 1:
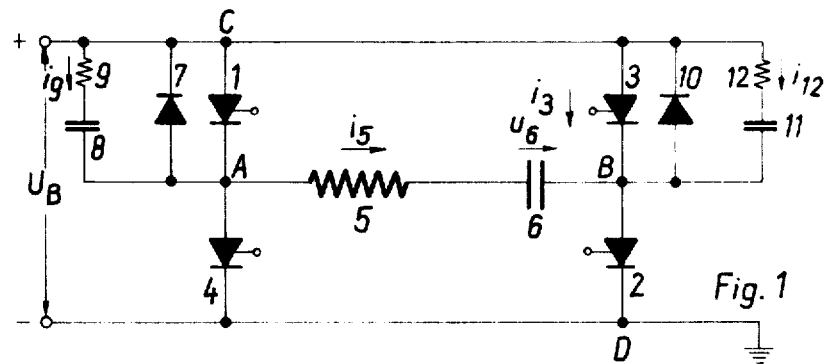
FIG. 1 is a circuit diagram of a first converter in accordance with the invention.

An oscillating circuit converter according to FIG. 1 comprises a bridge circuit of four electronic switches 1,2,3 and 4. A direct voltage $U_B$, which may be taken more particularly from a battery, is applied to one diagonal C–D of the bridge. The end point C is connected to the positive terminal and the end point D to the negative terminal of the direct voltage source. Between the end points A and B of the other diagonal (first diagonal), there is a series oscillating circuit of a coil 5 with an inductance $L_S$ and a capacitor 6 with a capacitance $C_S$.

Four thyristors 1,2,3 and 4, used as switches, are so arranged that the current paths 1–5–6–2 and 3–6–5–4 are possible if the corresponding pairs of thyristors 1,2,or 3,4 are ignited. The end points A and C of the bridge diagonals between which is located the thyristor 1, passing current from C to A, are interconnected by a parallel circuit comprising a diode 7 and a series circuit of a capacitor 8 and a resistor 9. The polarity of the diode 7 is opposite to the polarity of the thyristor 1. The end points B and C of the bridge diagonals, between which is mounted the thyristor 3 with the pass direction from C to D, are interconnected by a parallel circuit comprising a diode 10 and a series circuit with a capacitor 11 and a resistor 12. The diode 10 has the opposite polarity to the thyristor 3.

The thyristors 1 and 3 are mounted in the bridge circuit in series with opposite polarities.

In the following, the operation of the oscillating circuit converter according to the invention and shown in FIG. 1 will be described. In this embodiment, the coil 5 is the heating coil for a device for the inductive heating of materials. Such a device can be operated advantageously only with an alternating current, the frequency of which is higher than the main frequency. In some cases, an alternating current with a higher frequency is even necessary. In consequence of the generation of heat, the series oscillating circuit 5,6 is dampened. The oscillating circuit converter is assumed to be started up by firing the thyristors 1 and 2 by applying control signals to the associated control electrodes and said signals are generated by a control apparatus not shown in FIG. 1. As may be seen from FIG. 2a, the oscillating circuit current i5 flowing through the path 1–5–6–2 becomes zero at the end t1 of the first half-period. With zero passage the thyristors 1 and 2 are quenched (see FIGS. 2b and 2g), so that the current path 1–5–6–2 is blocked. The other current path 3–6–5 –2 cannot be opened immediately because the thyristors 1 and 2, now not carrying current, cannot accept immediately a high positive blocking voltage which would occur in them on the firing of 3 and 4. In order to prevent back-ignition, the free time of growth of the thyristors must be restrained.

Figure 2A:
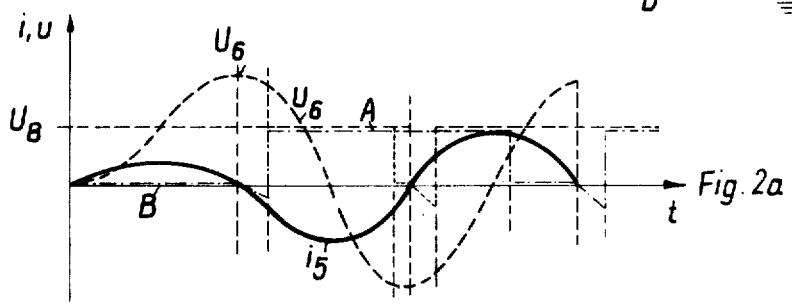
FIGS. 2a to 2i show the voltage and current curves in different elements of the converter according to FIG. 1.
Figure 2B:
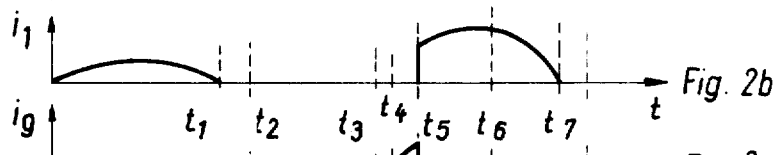
Figure 2C:
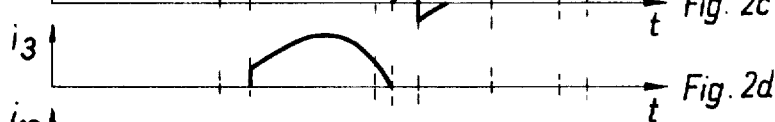
Figure 2D:
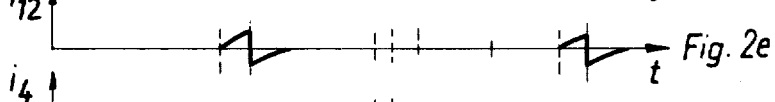

According to FIG. 2a, the capacitor 6 of the oscillating circuit is charged to $u6_{max}$, $u6_{max}$ being greater than $U_B$. As shown in FIG. 1, it discharges through the coil 5, the diode 7, the resistor 12, and the capacitor 11. The transfer current i12 (FIG. 2e) has the direction indicated in FIG. 1.

Immediately after zero passage of the current i5, the quenched thyristors carry only such blocking voltages, which cannot cause re-ignition, as may be seen from the voltage curves of the points A and B shown in dotted and dash-dot lines respectively in FIG. 2a.

The transfer through the current path 5–7–12–11 continues to the instant t2 when the thyristor 3 is fired. The difference t2 – t1 is substantially equal to the development time of the thyristors used. The control or firing signal for the thyristor 3 is derived from the negative potential forming at the point B. The amount of this negative voltage is substantially smaller than the voltage occurring in the first known circuit in which the transfer takes place only after the firing of thyristor 3; in the known construction, the voltage could reach the high value $U6-U_B$.

With the firing of the thyristor 3, the oscillating circuit current commutates from the series circuit 11, 12 to the thyristor 3. The oscillating circuit (L, C) is now capable of oscillating freely via the thyristor 3, and the diode 7, as shown by the curve of i3 (FIG. 2d) and i7 (FIG. 2h).

As the free oscillation is dampened, energy must be supplied to the oscillating circuit. To this end, the thyristor 4 is fired by a signal coming from the control apparatus at the instant t3, which precedes the end of the first negative half-period of the current i5 of the oscillating circuit; the voltage of A jumps from $U_B$ to zero. From this moment t3 the oscillating circuit current flows along the path 3–6–5–4 to the voltage source for the duration t4 – t3 (see FIG. 2f).

Figure 2E:
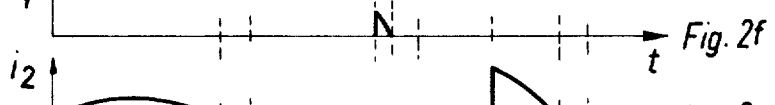
Figure 2F:
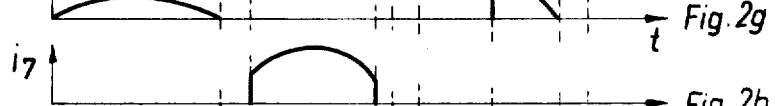
Figure 2G:
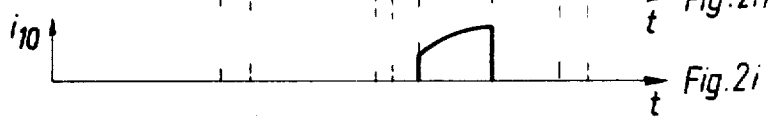
Figure 2H:
Figure 2I:

During zero passage of the oscillating circuit current, the thyristors 3 and 4 are blocked (see FIGS. 2e and 2f). At the moment t4, the capacitor 6 is charged with a different polarity than at the moment t1; after the blocking of the valves 3 and 4, the capacitor 6 is recharged by the current $1_9$ through the current path 10–9–85, and a negative voltage forms at the point A. The charge transfer through this current path lasts until the thyristor 1 is fired at the moment t5.

The associated control signal is derived in a like manner from the negative voltage at the point A (see FIGS. 2a, 2c). After the firing of the valve 1, the current of the oscillating circuit changes from the series circuit 8,9 to the thyristor 1. The oscillating circuit can now oscillate freely through the thyristor 1 and the diode 10 (FIGS. 2b,2c). At a moment t6 which occurs prior to t7 and thus before the end of the second positive half-period of i5, the thyristor 2 is fired so that current i5 flows through the path 1–5–6–2 and to the voltage source, thereby supplying energy to the oscillating circuit. (see FIG. 2g). After $t7$ a new transfer current $i12$ flows and B again becomes negative (see FIG. 2e). The moments $t3$ and $t6$ for the energy receiving—firing signal are determined by the dimension of the dampening and are adjusted by comparing the nominal and real outputs.

The resistors 9 and 12 need not be dimensioned for the full current of the oscillating circuit, as is clearly shown by the curves of $i9$ and $i12$ indicated in FIGS. 2c and 2e.

Figure 3:
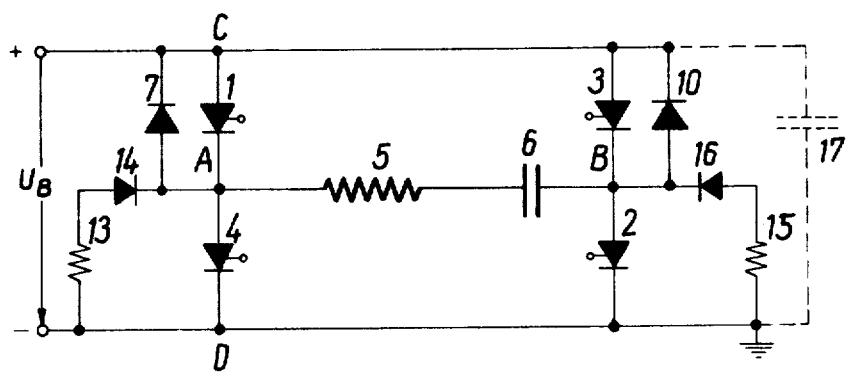
FIG. 3 shows the circuit diagram of a second converter according to the invention.

In the embodiment shown in FIG. 3, a series circuit comprising a resistor 13 and a diode 14 is mounted between the points A and D, the pass direction being in the direction from D to A. Between the points B and D there is a series circuit of a resistor 15 and a diode 16, the pass direction being in a direction from D to B.

The same reference numerals as in FIG. 1 have been used for the same elements used in FIG. 3.

The recharging of the capacitor 6 is here possible through the current path 15–16–6–5–7 if the thyristors 1 and 2 are blocked, or through the current path 13–14–5b–6–10, if the thyristors 3 and 4 are blocked. Since both current paths can be closed only through the voltage source, this arrangement comprises an energy feedback to a small degree. If an energy feedback into the DC voltage source is not possible, the energy may be absorbed by a capacitor connecting the two terminals of the DC voltage source.

Also in this arrangement negative voltages are applied to the thyristors immediately after the quenching and keep the growth times short. The limiting elements 13, 14 and 15, 16 need to be designed only for small currents. The description relating to FIG. 1 and FIGS. 2a to 2i is applicable also in this case.

Figure 4:
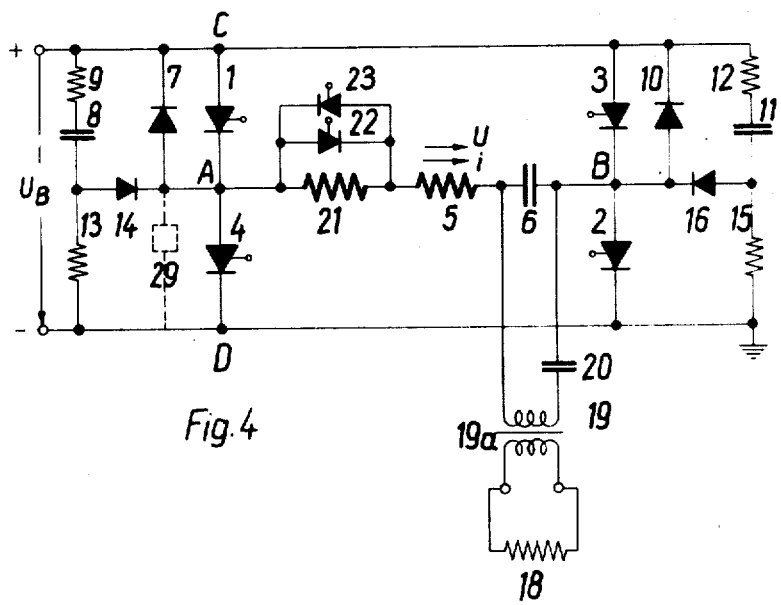
FIG. 4 shows a circuit diagram of a third converter according to the invention, constructed for frequency control.

The embodiment according to FIG. 4 behaves with regard to the recharging of the capacitor 6 practically in the same manner as the embodiment of FIG. 1, if the same structural elements 8, 9, 11 and 12 are used for both arrangements. In this case, the capacitors 8 and 11 have the same voltage curves after zero passage of the current of the oscillating circuit. The different operation only becomes apparent with the subsequent control of the members 1 or 3. This may be demonstrated with reference to the capacitor 8 which fully discharges in the circuit according to FIG. 1 during the time $t6 - t2$ along the current path 8–9–3–6–5. However, in the embodiment in accordance with FIG. 4, the discharge takes place only up to the voltage of the source $U_B$. From the incomplete discharge there follows, with the same operation, a reduction in the overall losses of the additional circuit. The discharge current of the capacitor 8 flows through the resistors 9 and 13 and through the source $U_B$ provided that the source permits this. If, on the other hand, the source does not permit this feedback, the discharge starts only with the opening of the control switch 2.

Figure 5:
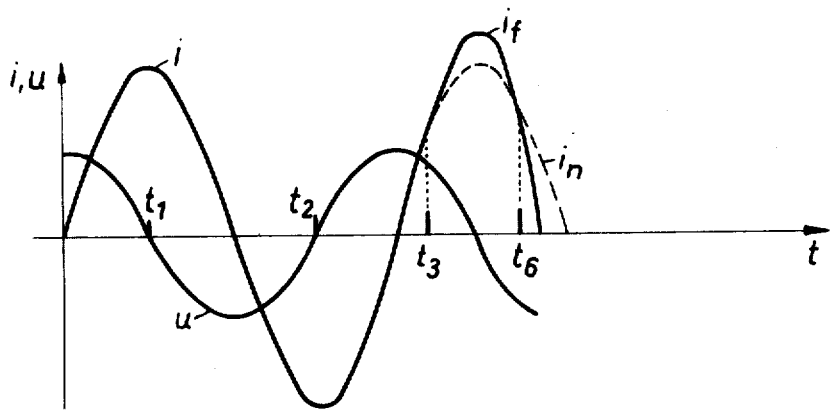
FIG. 5 shows the curve of the controlled and uncontrolled current of the oscillating circuit in the converter according to FIG. 4.

In the embodiment of FIG. 4, the coil 5 does not comprise a coil for inductive heating. Energy is withdrawn from the oscillating circuit by connecting a load 18 through a transformer 19 and a coupling capacitor 20 in parallel with the capacitor 6 of the oscillating circuit. The load 18 need not be purely effective load $18a$ but may have an inductive and/or capacitive reactive component $18b$ and $18c$. (FIG. 5).

The transformer 19 is used for adapting the oscillating circuit to the consumption. The relevance of the coupling capacitor 20 will be explained hereinafter. The reactive components $18b$ and $18c$ of the load 18 act to put the frequency of the oscillating circuit out of tune. To maintain the frequency at a constant level, an additional coil 21 is connected in series with the coil 5, and two thyristors 22 and 23 are connected in antiparallel to this additional coil 21.

This frequency control will now be described with reference to FIG. 5. When a control signal is applied to the control electrodes of the thyristors 22 and 23 at the moment $t3$, the thyristor 22 fires and short circuits the coil 21. In consequence, the inductance of the oscillating circuit becomes smaller, that is to say the transient derivations of the current of the oscillating circuit $(i_f)$ and of the oscillating circuit voltage become larger and the half-period correspondingly shorter. At the moment $t6$, the transistor 22 is again blocked if the current $i$ of the oscillating circuit reaches the same value as at the moment $t3$. From this, there results the current curve $i_f$. The time difference between the zero passages of the current $i_f$ and the current $i_n$ resulting without frequency control, may be clearly seen. If the valves 22 and 23 are controlled in the same rhythm and at the same time, the oscillating circuit is automatically synchronized with the control signals when these lie within the corresponding frequency range. The coils 5 and 21 may also be connected in parallel.

Since small dissymmetries in the bridge circuit caused by dissimilar constructional elements, or a noniniform control of the thyristors, lead to a DC voltage component in the voltage $u_6$, one lead to the transformer 19 contains a capacitor 20, so that the DC portion of the primary current does not result in a saturation of the transformer core $29a$. The resulting operative disturbance may be abolished very easily because the DC component gives rise to a pronounced dissymmetrical reaction of the bridge circuit. The coupling capacitor 20 may be so dimensioned that no failure of the oscillations of the oscillating circuit occurs either in the case of a short circuit or even on overload.

Figure 6:
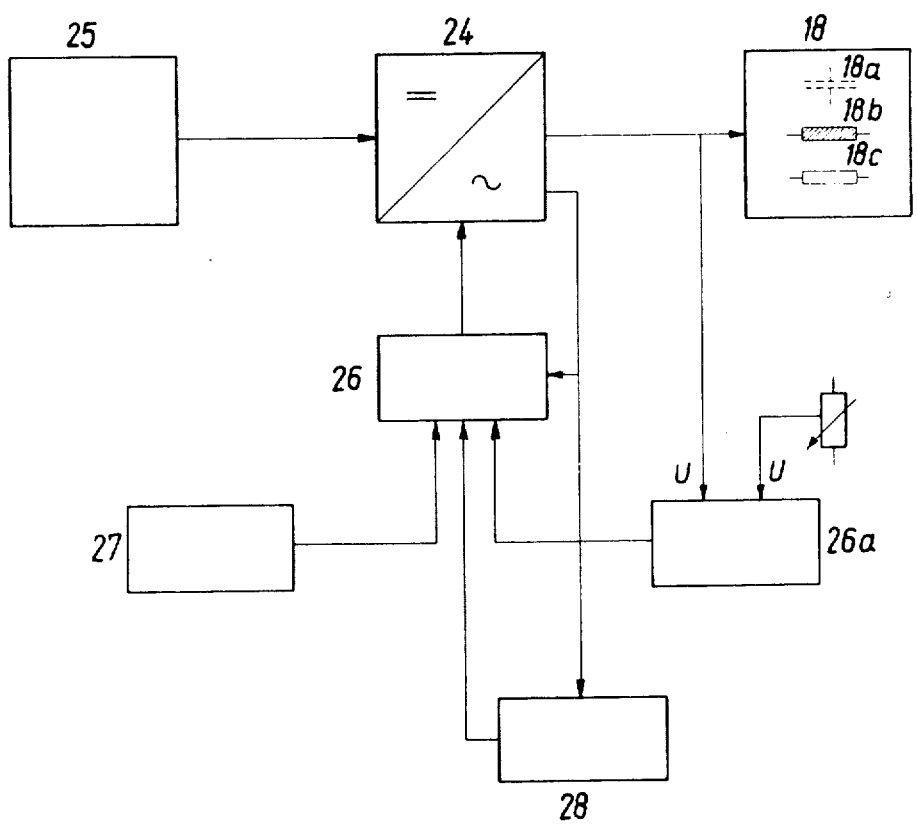
FIG. 6 is a block diagram of an arrangement containing a converter in accordance with the invention.

FIG. 6 shows a block diagram of an arrangement which comprises a converter 24 according to the invention. Energy is taken from a DC voltage source 25 and supplied to a load 18. The real voltage supplied to the load is compared with the nominal voltage in a voltage control $26a$. A control signal, corresponding to the difference is supplied to a control device 26. A frequency generator 27 is also connected to this control device 26. Furthermore, a current limiter 28 acts on the control device 26 and prevents the converter from being overloaded.

Arrangements of this kind are particularly suitable for supplying electronic apparatus, which require a purely sine shaped output voltage with constant amplitude and low distortion factor. The novel and surprising manner of operation of the invention has the following characteristics:

1. A low voltage stress of the valves. The valves receive only the source voltage $U_B$ and not the voltage of the oscillating circuit which may be many times higher.
2. The absence of an energy feedback to the source $U_B$.

3. The elimination of the interval between the half-periods of the oscillation.
4. The favorable conditions with regard to the release time of the thyristors.

What we claim is:

1. In an oscillating circuit converter having:
a thyristor bridge comprising
first and second input terminals and first and second output terminals,
first and second thyristors respectively connected between said first input terminal and said first and second output terminals,
third and fourth thyristors respectively connected between said first and second output terminals and said second input terminal;
means for connecting a source of DC potential across said first and second input terminals;
first and second diodes connected oppositely in parallel with said first and second thyristors, respectively; and
a series circuit of a first capacitor and a first coil coupled between said first and second output terminals,
the improvement comprising:
a third diode and a first resistor connected in series between said first output terminal and said second input terminal, said third diode being oriented from said second input terminal toward said first output terminal, in the same direction as said second diode is oriented from said second output terminal toward said first input terminal; and
a fourth diode and a second resistor connected in series between said second output terminal and said second input terminal, said fourth diode being oriented, from said second input terminal toward said second output terminal, in the same direction as said first diode is oriented from said first output terminal toward said first input terminal.

2. A converter according to claim 8, further including a third resistor and a second capacitor connected in series between said first input terminal and the junction of said third diode and said first resistor, and a fourth resistor and a third capacitor connected in series between said first input terminal and the junction point of said fourth diode and said second resistor.

3. A converter according to claim 8, wherein the series circuit of said first capacitor and said first coil further includes a second coil coupled to said first coil and further including a pair of thyristors connected oppositely parallel across said second coil to control the inductance of said series circuit.

4. A converter according to claim 10, further including a third resistor and a second capacitor connected in series between said first input terminal and the junction of said third diode and said first resistor, and a fourth resistor and a third capacitor connected in series between said first input terminal and the junction point of said fourth diode and said second resistor.

5. A converter according to claim 10, further including means for energizing both thyristors of said pair of thyristors simultaneously.

6. A converter according to claim 11, further including means for energizing both thyristors of said pair of thyristors simultaneously.

7. A converter according to claim 12, wherein said first and second coils are connected in series.

8. A converter according to claim 12, wherein said first and second coils are connected in parallel.

9. A converter according to claim 8, further including a load, transformer-coupled to said series circuit and including a coupling capacitor between said transformer and said series circuit.

10. A converter according to claim 14, further including a load transformer-coupled to said series circuit and including a coupling capacitor between said transformer and said series circuit.

11. A converter according to claim 15, further including a load, transformer-coupled to said series circuit and including a coupling capacitor between said transformer and said series circuit.

12. A converter according to claim 13, wherein said first and second coils are connected in parallel and further including a load, transformer-coupled to said series circuit nd including a coupling capacitor between said transformer and said series circuit.

* * * * *